(12) United States Patent
Ishikawa et al.

(10) Patent No.: US 11,731,399 B2
(45) Date of Patent: Aug. 22, 2023

(54) INTERLAYER FILM FOR LAMINATED GLASS, AND LAMINATED GLASS

(71) Applicant: SEKISUI CHEMICAL CO., LTD., Osaka (JP)

(72) Inventors: Yuki Ishikawa, Osaka (JP); Tatsuya Iwamoto, Shiga (JP); Shinji Kawada, Osaka (JP); Yuuki Okada, Osaka (JP)

(73) Assignee: SEKISUI CHEMICAL CO. LTD., Osaka (JP)

(*) Notice: Subject to any disclaimer, the term of this patent is extended or adjusted under 35 U.S.C. 154(b) by 0 days.

(21) Appl. No.: 17/622,416

(22) PCT Filed: Nov. 20, 2019

(86) PCT No.: PCT/JP2019/045502
§ 371 (c)(1),
(2) Date: Dec. 23, 2021

(87) PCT Pub. No.: WO2021/002034
PCT Pub. Date: Jan. 7, 2021

(65) Prior Publication Data
US 2022/0332095 A1    Oct. 20, 2022

(30) Foreign Application Priority Data
Jul. 2, 2019   (JP) .................................. 2019-123789

(51) Int. Cl.
*B32B 17/10*     (2006.01)
*B32B 27/08*     (2006.01)
(Continued)

(52) U.S. Cl.
CPC .. *B32B 17/10743* (2013.01); *B32B 17/10036* (2013.01); *B32B 17/10605* (2013.01);
(Continued)

(58) Field of Classification Search
CPC ........ B32B 17/10743; B32B 17/10761; B32B 7/00–7/14
See application file for complete search history.

(56) References Cited

U.S. PATENT DOCUMENTS

2013/0189528 A1   7/2013   Matsuda et al.
2015/0030860 A1   1/2015   Shimamoto et al.
(Continued)

FOREIGN PATENT DOCUMENTS

CN    105000810    10/2015
EP    3 388 402    10/2018
(Continued)

OTHER PUBLICATIONS

Machine translation of JP2003-040653. Retrieved Dec. 13, 2022.*
(Continued)

*Primary Examiner* — Prashant J Khatri
(74) *Attorney, Agent, or Firm* — Wenderoth, Lind & Ponack, L.L.P.

(57) ABSTRACT

Provided is an interlayer film for laminated glass capable of enhancing the sound insulating property of laminated glass over a wide resonance frequency region. An interlayer film for laminated glass according to the present invention has a one-layer or two or more-layer structure, and when the interlayer film is arranged between two sheets of clear float glass having a width of 25 mm, a length of 300 mm and a thickness of 2 mm to obtain a laminated glass X, a loss factor at a second resonance frequency, a loss factor at a third resonance frequency, and a loss factor at a fourth resonance frequency measured by a central exciting method at 20° C. in mechanical impedance measurement in accordance with ISO16940 of the laminated glass X are respectively 0.4 or more.

17 Claims, 2 Drawing Sheets

(51) Int. Cl.
B32B 27/22 (2006.01)
B32B 27/30 (2006.01)

(52) U.S. Cl.
CPC .............. B32B 27/08 (2013.01); B32B 27/22 (2013.01); B32B 27/308 (2013.01); *B32B 2307/102* (2013.01); *B32B 2307/412* (2013.01); *B32B 2307/558* (2013.01); *B32B 2307/732* (2013.01); *B32B 2419/00* (2013.01); *B32B 2605/006* (2013.01)

(56) References Cited

U.S. PATENT DOCUMENTS

| | | |
|---|---|---|
| 2017/0028687 A1 | 2/2017 | DeRosa et al. |
| 2017/0320297 A1 | 11/2017 | Bennison et al. |
| 2017/0334173 A1 | 11/2017 | Yui et al. |
| 2017/0341347 A1 | 11/2017 | Nakamura |
| 2017/0361575 A1 | 12/2017 | Kusudou et al. |
| 2018/0290436 A1 | 10/2018 | Yui et al. |
| 2018/0290437 A1 | 10/2018 | Kobayashi et al. |
| 2018/0290439 A1 | 10/2018 | Kusudou et al. |
| 2019/0193377 A1 | 6/2019 | Shimamoto et al. |
| 2019/0240958 A1 | 8/2019 | DeRosa et al. |
| 2019/0345352 A1 | 11/2019 | Suzuki et al. |
| 2019/0375196 A1 | 12/2019 | Yui et al. |
| 2020/0130338 A1 | 4/2020 | Ishikawa |
| 2020/0171798 A1 | 6/2020 | Sakamoto et al. |
| 2020/0198301 A1 | 6/2020 | Iwamoto et al. |
| 2021/0039360 A1 | 2/2021 | Ishikawa et al. |
| 2021/0046740 A1 | 2/2021 | Iwamoto et al. |
| 2021/0060907 A1 | 3/2021 | Ishikawa et al. |

FOREIGN PATENT DOCUMENTS

| | | | |
|---|---|---|---|
| EP | 3 747 846 | | 12/2020 |
| JP | 2003040653 A | * | 2/2003 |
| JP | 2016-107632 | | 6/2016 |
| JP | 2016-108226 | | 6/2016 |
| JP | 2017-124970 | | 7/2017 |
| JP | 2018-154519 | | 10/2018 |
| JP | 2018-532135 | | 11/2018 |
| WO | 2013/105657 | | 7/2013 |
| WO | 2018/155515 | | 8/2018 |
| WO | 2018/181751 | | 10/2018 |
| WO | 2018/181758 | | 10/2018 |
| WO | 2018/212332 | | 11/2018 |
| WO | 2019/022000 | | 1/2019 |
| WO | 2019/151326 | | 8/2019 |
| WO | 2019/151327 | | 8/2019 |
| WO | 2019/151328 | | 8/2019 |
| WO | 2019/151329 | | 8/2019 |

OTHER PUBLICATIONS

International Preliminary Report on Patentability and Written Opinion of the International Searching Authority dated Dec. 28, 2021 in International (PCT) Application No. PCT/JP2019/045502.

International Search Report (ISR) dated Dec. 24, 2019 in International (PCT) Application No. PCT/JP2019/045502.

Extended European Search Report and European Search Opinion dated Jun. 23, 2023 issued in European Patent Application No. 19935791.4.

* cited by examiner

[FIG. 1]
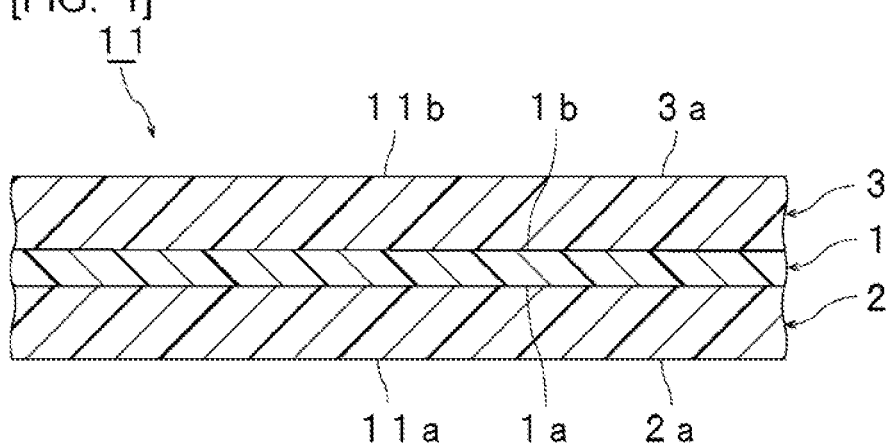
[FIG. 2]
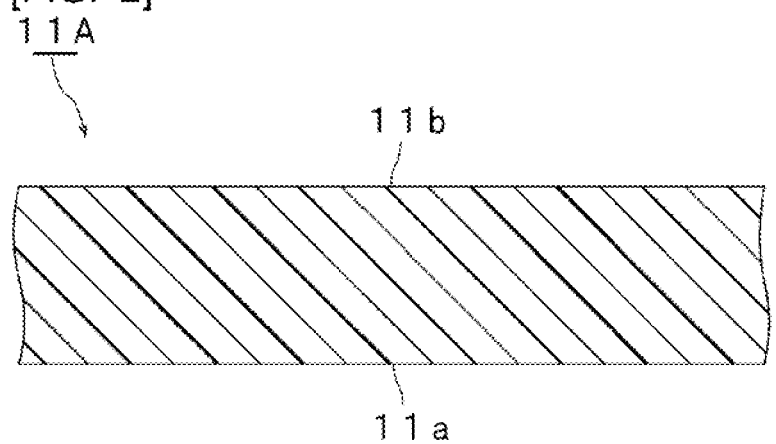
[FIG. 3]
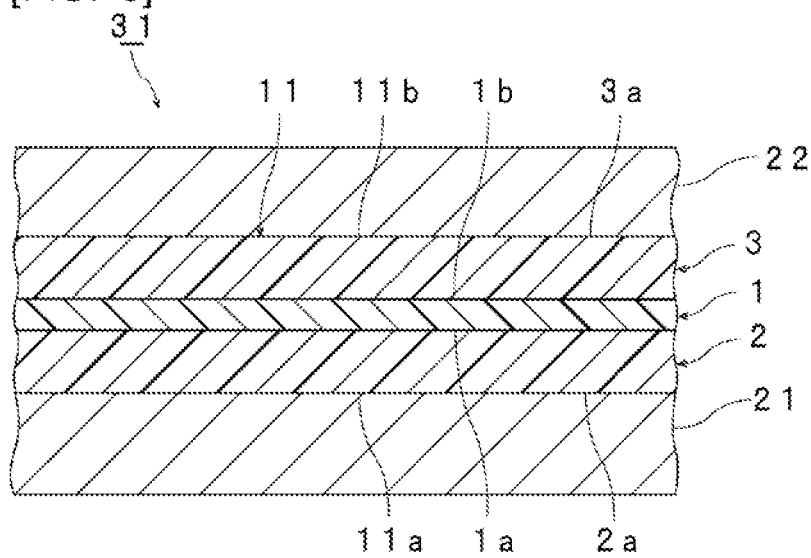

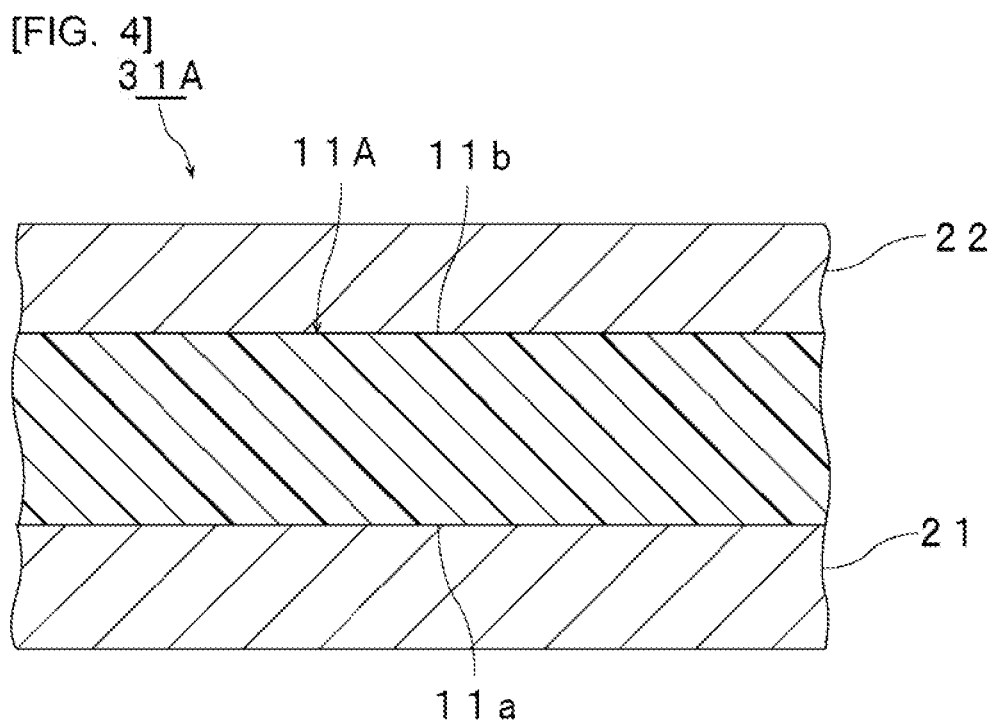

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

As one example of the interlayer film for laminated glass, the following Patent Document 1 discloses an interlayer film for laminated glass including a first layer, and a second layer layered on a first surface of the first layer, wherein the first layer contains a polyvinyl acetate resin and a plasticizer. In Examples of Patent Document 1, for a laminated glass prepared with the interlayer film, a loss factor at the resonance frequency in the fourth mode (approximately 3150 Hz) measured by a central exciting method under the condition of 20° C. (20° C. loss factor) and a loss factor at the resonance frequency in the sixth mode (approximately 6300 Hz) measured by a central exciting method under the condition of 30° C. (30° C. loss factor) were determined.

The following Patent Document 2 discloses a laminate having an A layer and a plurality of B layers, the A layer comprising a resin composition having a peak, at which tan δ measured by a complex shear viscosity test under the condition of a frequency of 1 Hz in accordance with JIS K7244-10 peaks is maximum, within the range of −40 to 30° C., wherein the A layer is layered between at least two B layers. In the laminate, when the laminate is sandwiched between two sheets of float glass having a length of 300 mm, a width of 25 mm and a thickness of 1.9 mm, a loss factor at a fourth resonance frequency measured by a central exciting method at 20° C. is 0.2 or more, and a flexural rigidity at the fourth resonance frequency calculated in accordance with ISO16940 (2008) is 150 N·m or more.

The following Patent Document 3 discloses an interlayer film for laminated glass wherein when a laminated glass obtained by sandwiching the interlayer film between two sheets of glass having a width of 50 mm, a length of 300 mm and a thickness of 3 mm is measured for a loss factor in a third mode in a dumping test of the laminated glass by a central exciting method, a width of the temperature range where the loss factor is 0.2 or more is 15° C. or more.

RELATED ART DOCUMENTS

Patent Documents

Patent Document 1: WO2013/105657A1
Patent Document 2: JP 2016-107632 A
Patent Document 3: JP 2016-108226 A

SUMMARY OF THE INVENTION

Problems to be Solved by the Invention

In laminated glasses prepared with the interlayer films according to Patent Documents 1 to 3, it is possible to enhance the sound insulating property in a specific resonance frequency region. However, in conventional laminated glasses, even if the sound insulating property can be enhanced in a specific resonance frequency region, the sound insulating property may deteriorate in other resonance frequency region than the specific resonance frequency region. Thus, it is difficult to enhance the sound insulating property over a wide resonance frequency region (for example, 500 Hz to 10000 Hz) in laminated glasses prepared with conventional interlayer films.

An object of the present invention is to provide an interlayer film for laminated glass capable of enhancing the sound insulating property of laminated glass over a wide resonance frequency region. It is also an object of the present invention to provide a laminated glass prepared with the interlayer film for laminated glass.

Means for Solving the Problems

According to a broad aspect of the present invention, there is provided an interlayer film for laminated glass (in the present specification, "interlayer film for laminated glass" is sometimes abbreviated as "interlayer film") having a one-layer or two or more-layer structure, wherein when the interlayer film is arranged between two sheets of clear float glass having a width of 25 mm, a length of 300 mm and a thickness of 2 mm to obtain a laminated glass X, a loss factor at a second resonance frequency, a loss factor at a third resonance frequency, and a loss factor at a fourth resonance frequency measured by a central exciting method at 20° C. in mechanical impedance measurement in accordance with ISO16940 of the laminated glass X are respectively 0.4 or more.

In a specific aspect of the interlayer film according to the present invention, a loss factor at a fifth resonance frequency measured by a central exciting method at 20° C. in mechanical impedance measurement in accordance with ISO16940 of the laminated glass X is 0.4 or more.

In a specific aspect of the interlayer film according to the present invention, the loss factor at the second resonance frequency is 0.5 or more, the loss factor at the third resonance frequency is 0.5 or more, and the loss factor at the fourth resonance frequency is 0.5 or more.

In a specific aspect of the interlayer film according to the present invention, the loss factor at the third resonance frequency is larger than the loss factor at the second resonance frequency.

In a specific aspect of the interlayer film according to the present invention, the loss factor at the fourth resonance frequency is larger than the loss factor at the second resonance frequency.

In a specific aspect of the interlayer film according to the present invention, the interlayer film has a two or more-layer structure, and includes a first layer, and a second layer layered on a first surface of the first layer, and the first layer contains a (meth)acrylic polymer and a plasticizer.

In a specific aspect of the interlayer film according to the present invention, the interlayer film has a three or more-layer structure, and includes a third layer layered on a second surface opposite to the first surface of the first layer.

In a specific aspect of the interlayer film according to the present invention, when the interlayer film is arranged between two sheets of clear float glass having a thickness of 2 mm to obtain a laminated glass Y having a size of 300 mm in length and 300 mm in width, and the obtained laminated glass Y is subjected to the following impact resistance test at −20° C., a peeled area in an interface between the first layer and the second layer is 50% or less.

Impact resistance test at −20° C.: the laminated glass Y is stored at −20±2° C. for 4 hours or more. For the laminated glass Y after storage, a steel ball with a mass of 227±2 g and a diameter of 38 mm is dropped from a height of 9.5 m to a position that is a middle position in the longitudinal direction and a middle position in the widthwise direction of the laminated glass Y at −20±2° C. in accordance with JIS R3211 or JIS R3212. A peeled area in the interface between the first layer and the second layer of the interlayer film is determined.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass including a first lamination glass member, a second lamination glass member, and an interlayer film for laminated glass having a one-layer or two or more-layer structure, the laminated glass showing a loss factor at a second resonance frequency, a loss factor at a third resonance frequency, and a loss factor at a fourth resonance frequency measured by a central exciting method at 20° C. in mechanical impedance measurement in accordance with ISO16940 of respectively 0.4 or more.

In a specific aspect of the laminated glass according to the present invention, a loss factor at a fifth resonance frequency measured by a central exciting method at 20° C. in mechanical impedance measurement in accordance with ISO16940 is 0.4 or more.

In a specific aspect of the laminated glass according to the present invention, the loss factor at the second resonance frequency is 0.5 or more, the loss factor at the third resonance frequency is 0.5 or more, and the loss factor at the fourth resonance frequency is 0.5 or more.

In a specific aspect of the laminated glass according to the present invention, the loss factor at the third resonance frequency is larger than the loss factor at the second resonance frequency.

In a specific aspect of the laminated glass according to the present invention, the loss factor at the fourth resonance frequency is larger than the loss factor at the second resonance frequency.

In a specific aspect of the laminated glass according to the present invention, the interlayer film has a two or more-layer structure, and the interlayer film includes a first layer, and a second layer layered on a first surface of the first layer, and the first layer contains an acrylic resin and a plasticizer.

In a specific aspect of the laminated glass according to the present invention, the interlayer film has a three or more-layer structure, and the interlayer film includes a third layer layered on a second surface opposite to the first surface of the first layer.

In a specific aspect of the laminated glass according to the present invention, when the following impact resistance test at −20° C. is conducted, a peeled area in an interface between the first layer and the second layer is 50% or less.

Impact resistance test at −20° C.: the laminated glass is stored at −20±2° C. for 4 hours or more. For the laminated glass after storage, a steel ball with a mass of 227±2 g and a diameter of 38 mm is dropped from a height of 9.5 m to a position that is a middle position in the longitudinal direction and a middle position in the widthwise direction of the laminated glass at −20±2° C. in accordance with JIS R3211 or JIS R3212. A peeled area in the interface between the first layer and the second layer of the interlayer film is determined.

Effect of the Invention

The interlayer film for laminated glass according to the present invention has a one-layer or a two or more-layer structure. An interlayer film for laminated glass according to the present invention is arranged between two sheets of clear float glass having a width of 25 mm, a length of 300 mm and a thickness of 2 mm to obtain a laminated glass X. In the interlayer film for laminated glass according to the present invention, a loss factor at a second resonance frequency, a loss factor at a third resonance frequency, and a loss factor at a fourth resonance frequency measured by a central exciting method at 20° C. in mechanical impedance measurement in accordance with 15016940 of the laminated glass X are respectively 0.4 or more. Since the interlayer film for laminated glass according to the present invention has the above configuration, it is possible to enhance the sound insulating property of the laminated glass over a wide resonance frequency region.

The laminated glass according to the present invention includes a first lamination glass member, a second lamination glass member, and an interlayer film for laminated glass having a one-layer or two or more-layer structure. In the laminated glass according to the present invention, a loss factor at a second resonance frequency, a loss factor at a third resonance frequency, and a loss factor at a fourth resonance frequency measured by a central exciting method at 20° C. in mechanical impedance measurement in accordance with ISO16940 are respectively 0.4 or more. Since the laminated glass according to the present invention has the above configuration, it is possible to enhance the sound insulating property of the laminated glass over a wide resonance frequency region.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODE(S) FOR CARRYING OUT THE INVENTION

Hereinafter, the details of the present invention will be described.

(Interlayer Film for Laminated Glass)

The interlayer film for laminated glass according to the present invention (hereinafter, sometimes abbreviated as "interlayer film") has a one-layer structure or a two or more-layer structure.

An interlayer film for laminated glass according to the present invention is arranged between two sheets of clear float glass having a width of 25 mm, a length of 300 mm and a thickness of 2 mm to obtain a laminated glass X. In the interlayer film for laminated glass according to the present invention, a loss factor at a second resonance frequency, a loss factor at a third resonance frequency, and a loss factor at a fourth resonance frequency measured by a central exciting method at 20° C. in mechanical impedance measurement in accordance with ISO16940 of the laminated glass X are respectively 0.4 or more.

Since the interlayer film for laminated glass according to the present invention has the above configuration, it is possible to enhance the sound insulating property of the laminated glass over a wide resonance frequency region. In the interlayer film for laminated glass according to the present invention, it is also possible to enhance the vibration damping property of laminated glass. In the interlayer film for laminated glass according to the present invention, the sound insulating property and the vibration damping property can be enhanced not only in the coincidence region, but also over a resonance frequency region of, for example, 500 Hz to 10000 Hz. It is generally said that the sound insulating property follows the mass law (the sound insulating performance increases as the surface density (mass per 1 $m^2$) of the material increases). In the interlayer film for laminated glass according to the present invention, since the vibration damping property of laminated glass is enhanced, higher sound insulating property is obtained than that of the mass law even in a resonance frequency region of 2000 Hz or less, and the sound insulating property can be sufficiently enhanced.

The interlayer film according to the present invention has a one-layer structure or a two or more-layer structure. The interlayer film according to the present invention may have a one-layer structure or may have a two or more-layer structure. The interlayer film according to the present invention may have a two-layer structure, may have a three-layer structure, or may have a three or more-layer structure. The interlayer film according to the present invention includes a first layer. The interlayer film according to the present invention may be a single-layered interlayer film including only a first layer or may be a multi-layered interlayer film including a first layer and other layer.

The interlayer film may have only a first layer, or may include a second layer in addition to the first layer. It is preferred that the interlayer film include a second layer as a surface layer of the interlayer film. It is preferred that the second layer be a surface layer of the interlayer film. When the interlayer film includes the second layer, the second layer is arranged on a first surface side of the first layer.

The interlayer film may have a three or more-layer structure and may include a third layer in addition to the first layer and the second layer. It is preferred that the interlayer film include a third layer as a surface layer of the interlayer film. It is preferred that the third layer be a surface layer of the interlayer film. When the interlayer film includes the second layer and the third layer, the third layer is arranged on a second surface side opposite to the first surface of the first layer.

An interlayer film according to the present invention is arranged between two sheets of clear float glass having a width of 25 mm, a length of 300 mm and a thickness of 2 mm to prepare a laminated glass X.

The laminated glass X is prepared for conducting mechanical impedance measurement.

It is preferred that the laminated glass X be prepared in the following manner.

Two sheets of clear float glass having a width of 25 mm, a length of 300 mm and a thickness of 2 mm in accordance with JIS R3202 are prepared. An interlayer film having a width of 25 mm and a length of 300 mm is prepared. The interlayer film is sandwiched between the two sheets of clear float glass to obtain a laminate X. The obtained laminate X is put into a rubber bag and the inside thereof is degassed for 20 minutes at a degree of vacuum of 2.6 kPa, after which the laminate is transferred into an oven while being degassed, and furthermore, retained at 90° C. for 30 minutes and pressed under vacuum, and thus the laminate X is preliminarily press-bonded. The preliminarily press-bonded laminate X is subjected to press-bonding for 20 minutes under conditions of 135° C. and a pressure of 1.2 MPa in an autoclave to obtain a laminated glass X.

In the interlayer film according to the present invention, a loss factor at a second resonance frequency measured by a central exciting method at 20° C. in mechanical impedance measurement in accordance with ISO16940 of the laminated glass X is 0.4 or more. Since the loss factor at the second resonance frequency is 0.4 or more, it is possible to enhance the sound insulating property of the laminated glass in a resonance frequency region of, for example, 500 Hz to 1200 Hz.

From the viewpoint of further enhancing the sound insulating property, the loss factor at the second resonance frequency is preferably 0.45 or more, more preferably 0.5 or more, further preferably 0.55 or more.

In the interlayer film according to the present invention, a loss factor at a third resonance frequency measured by a central exciting method at 20° C. in mechanical impedance measurement in accordance with ISO16940 of the laminated glass X is 0.4 or more. Since the loss factor at the third resonance frequency is 0.4 or more, it is possible to enhance the sound insulating property of the laminated glass in a resonance frequency region of, for example, 1200 Hz to 2500 Hz.

From the viewpoint of further enhancing the sound insulating property, the loss factor at the third resonance frequency is preferably 0.45 or more, more preferably 0.5 or more, further preferably 0.55 or more. The loss factor at the third resonance frequency may be more than 0.4, may be more than 0.45, may be more than 0.5, or may be more than 0.55.

In the interlayer film according to the present invention, a loss factor at a fourth resonance frequency measured by a central exciting method at 20° C. in mechanical impedance measurement in accordance with ISO16940 of the laminated glass X is 0.4 or more. Since the loss factor at the fourth resonance frequency is 0.4 or more, it is possible to enhance the sound insulating property of the laminated glass in a resonance frequency region of, for example, 2400 Hz to 4400 Hz.

From the viewpoint of further enhancing the sound insulating property, the loss factor at the fourth resonance frequency is preferably 0.45 or more, more preferably 0.5 or more, further preferably 0.55 or more. The loss factor at the fourth resonance frequency may be more than 0.4, may be more than 0.45, may be more than 0.5, or may be more than 0.55. The loss factor at the fourth resonance frequency may be 0.41 or more, may be 0.46 or more, may be 0.51 or more, or may be 0.56 or more.

In the interlayer film according to the present invention, a loss factor at a fifth resonance frequency measured by a central exciting method at 20° C. in mechanical impedance measurement in accordance with ISO16940 of the laminated glass X is preferably 0.4 or more, more preferably 0.45 or more, further preferably 0.5 or more, especially preferably 0.55 or more. The loss factor at the fifth resonance frequency may be more than 0.4, may be more than 0.45, may be more than 0.5, or may be more than 0.55. The loss factor at the fifth resonance frequency may be 0.41 or more, may be 0.46 or more, may be 0.51 or more, or may be 0.56 or more. When the loss factor at the fifth resonance frequency is the above lower limit or more, it is possible to further enhance the sound insulating property of the laminated glass in a resonance frequency region of, for example, 4000 Hz to 6500 Hz.

In the interlayer film according to the present invention, a loss factor at a sixth resonance frequency measured by a central exciting method at 20° C. in mechanical impedance measurement in accordance with ISO16940 of the laminated glass X is preferably 0.4 or more, more preferably 0.45 or more, further preferably 0.5 or more. When the loss factor at the sixth resonance frequency is the above lower limit or more, it is possible to further enhance the sound insulating property of the laminated glass in a resonance frequency region of, for example, 5500 Hz to 10000 Hz.

In the interlayer film according to the present invention, a loss factor at a seventh resonance frequency measured by a central exciting method at 20° C. in mechanical impedance measurement in accordance with ISO16940 of the laminated glass X is preferably 0.4 or more, more preferably 0.42 or more, further preferably 0.44 or more. When the loss factor at the seventh resonance frequency is the above lower limit or more, it is possible to further enhance the sound insulating property of the laminated glass in a resonance frequency region of, for example, 7000 Hz to 13000 Hz.

From the viewpoint of insulating road noise and motor noise of an electric vehicle, the loss factor at the third resonance frequency is preferably larger than the loss factor at the second resonance frequency, and is more preferably larger by 0.02 or more, and is further preferably larger by 0.04 or more.

From the viewpoint of insulating wind noise, engine noise of an engine-driven vehicle, and switching noise of an electric vehicle, the loss factor at the fourth resonance frequency is preferably larger than the loss factor at the second resonance frequency, and is more preferably larger by 0.06 or more, and is further preferably larger by 0.1 or more.

Among the loss factors measured by the central exciting method at 20° C. in mechanical impedance measurement in accordance with ISO16940 of the laminated glass X, it is preferred that the maximum value of the loss factors be the loss factor at the third resonance frequency, the loss factor at the fourth resonance frequency, or the loss factor at the fifth resonance frequency. It is more preferred that the maximum value of the loss factors be the loss factor at the fourth resonance frequency or the loss factor at the fifth resonance frequency. In this case, it is possible to improve the sound insulating property for various noises generated during driving of an automobile more effectively.

In mechanical impedance measurement in accordance with ISO16940 of the laminated glass X, a loss factor measured by the central exciting method at 20° C. is sometimes unmeasurable because the loss factor is too large. In the present invention, even when a loss factor measured by the central exciting method at 20° C. is unmeasurable because the loss factor is too large, the loss factor is regarded as being 0.4 or more.

As a method for controlling the loss factor at each resonance frequency to fall within the aforementioned preferred range or the like, the following methods are recited. (1) The loss factors at the second to seventh resonance frequencies increase by increasing the interlayer adhesive strength of the interlayer film. (2) The loss factors at the second to seventh resonance frequencies increase by increasing the modulus of elasticity of the interlayer film. (3) The loss factors at the second to seventh resonance frequencies can be adjusted by adjusting the surface density of the interlayer film. By appropriately combining these methods, it is possible to control the loss factor at each resonance frequency to fall within the aforementioned preferred range or the like.

When the interlayer film includes a first layer, and a second layer layered on a first surface of the first layer, the interlayer film is arranged between two sheets of clear float glass having a thickness of 2 mm to obtain a laminated glass Y having a size of 300 mm in length and 300 mm in width. When the obtained laminated glass Y is subjected to the following impact resistance test at −20° C., a peeled area in the interface between the first layer and the second layer is preferably 50% or less, more preferably 40% or less, further preferably or less. When the peeled area is the above upper limit or less, it is possible to further enhance the adhesive strength between the first layer and the second layer, and as a result, it is possible to further enhance the sound insulating property of the laminated glass over a wide resonance frequency region. The impact resistance test at −20° C. involves a temperature condition in which delamination is more likely to occur than in the impact resistance test at 20° C. or in the impact resistance test at 40° C.

Impact resistance test at −20° C.: the laminated glass Y is stored at −20±2° C. for 4 hours or more. For the laminated glass Y after storage, a steel ball with a mass of 227±2 g and a diameter of 38 mm is dropped from a height of 9.5 m to a position that is a middle position in the longitudinal direction and a middle position in the widthwise direction of the laminated glass Y at −20±2° C. in accordance with JIS R3211 or JIS R3212. A peeled area in the interface between the first layer and the second layer of the interlayer film is determined.

The peeled area can be determined, for example, by the following formula.

Peeled area (%)=100−[(area where first layer and second layer adhere after execution of impact resistance test at −20° C.)/(area where first layer and second layer adhere before execution of impact resistance test at −20° C.)×100]

The area where the first layer and the second layer adhere can be determined, for example, by photographing the laminated glass Y from above by a digital camera or the like, and calculating the area by image analysis of the adhered part and the peeled part.

The laminated glass Y is prepared for conducting the impact resistance test at −20° C.

It is preferred that the laminated glass Y be prepared in the following manner.

The interlayer film is sandwiched between the two sheets of clear float glass having a thickness of 2 mm to obtain a laminate Y. The obtained laminate Y is put into a rubber bag and the inside thereof is degassed for 20 minutes at a degree of vacuum of 2.6 kPa, after which the laminate is transferred into an oven while being degassed, and furthermore, retained at 90° C. for 30 minutes and pressed under vacuum, and thus the laminate Y is preliminary press-bonded. The preliminarily press-bonded laminate Y is subjected to press-bonding for 20 minutes under conditions of 135° C. and a pressure of 1.2 MPa in an autoclave to obtain a laminated glass Y having a size of 300 mm in length and 300 mm in width.

The interlayer film in laminated glass may be peeled off from the lamination glass members to prepare the laminated glass Y.

When the interlayer film includes a first layer, and a second layer layered on a first surface of the first layer, the peel strength of the second layer with respect to the first layer is preferably 5 N/10 mm or more, more preferably 6 N/10 mm or more, further preferably 7 N/10 mm or more. When the peel strength is the above lower limit or more, it is possible to enhance the adhesive strength between the first layer and the second layer, and as a result, it is possible to further enhance the sound insulating property.

When the interlayer film further includes a third layer layered on a second surface of the first layer, the peel strength of the third layer with respect to the first layer is preferably 5 N/10 mm or more, more preferably 6 N/10 mm or more, further preferably 7 N/10 mm or more. When the peel strength is the above lower limit or more, it is possible to enhance the adhesive strength between the first layer and the third layer, and as a result, it is possible to further enhance the sound insulating property.

The peel strength of the second and third layers with respect to the first layer can be determined by peeling the first layer and the second layer from each other, or peeling the first layer and the third layer from each other in directions of 180 degrees at a peel rate of 300 mm/min.

The interlayer film is arranged between two sheets of clear float glass having a thickness of 2 mm to obtain a laminated glass Z having a circular shape of 25 mm in diameter. When the obtained laminated glass Z is subjected to the following compression shear strength test, the compression shear strength is preferably 2000 N or more, more preferably 2500 N or more, further preferably 3000 N or more, especially preferably 3500 N or more. When the compression shear strength is the above lower limit or more, it is possible to enhance the adhesive strength between layers of the interlayer film and between the interlayer film and each lamination glass member, and as a result, it is possible to further enhance the sound insulating property.

Compression shear strength test: the laminated glass Z is stored at 23±2° C. for 24 hours or more. The laminated glass Z after storage is compressed at a compression speed of 2.5 mm/min such that the force is applied in a 45-degree oblique direction. Compression shear strength in the interface between layers of the interlayer film, or in the interface between the interlayer film and the clear float glass is measured.

The laminated glass Z is prepared for conducting the compression shear strength.

It is preferred that the laminated glass Z be prepared in the following manner.

The interlayer film is sandwiched between the two sheets of clear float glass having a thickness of 2 mm to obtain a laminate Z. The obtained laminate Z is put into a rubber bag and the inside thereof is degassed for 20 minutes at a degree of vacuum of 2.6 kPa, after which the laminate is transferred into an oven while being degassed, and furthermore, retained at 90° C. for 30 minutes and pressed under vacuum, and thus the laminate Z is preliminary press-bonded. The preliminarily press-bonded laminate Z is subjected to press-bonding for 20 minutes under conditions of 135° C. and a pressure of 1.2 MPa in an autoclave to obtain a laminated glass Z having a circular shape of 25 mm in diameter.

The interlayer film in laminated glass may be peeled off from the lamination glass members to prepare the laminated glass Z.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The interlayer film 11 has a three-layer structure. The second layer 2 is arranged on a first surface $1a$ of the first layer 1 to be layered thereon. The third layer 3 is arranged on a second surface $1b$ opposite to the first surface $1a$ of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged on the surface opposite to the first layer 1 of the second layer 2, and on the surface opposite to the first layer 1 of the third layer 3, respectively.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

Hereinafter, the details of the interlayer film according to the present invention, the first layer, the second layer and the third layer, and each ingredient used in the interlayer film will be described.

(Resin)

It is preferred that the interlayer film contain a resin (hereinafter, sometimes described as a resin (0)). It is preferred that the first layer contain a resin (hereinafter, sometimes described as a resin (1)). It is preferred that the second layer contain a resin (hereinafter, sometimes described as a resin (2)). It is preferred that the third layer contain a resin (hereinafter, sometimes described as a resin (3)). The resin (1), the resin (2), and the resin (3) may be the same as or different from one another. For still higher sound insulating property, it is preferred that the resin (1) be different from the resin (2) and the resin (3). One kind of each of the resin (0), the resin (1), the resin (2) and the resin (3) may be used alone, and two or more kinds thereof may be used in combination.

Examples of the resin (0), the resin (1), the resin (2) and the resin (3) include cured resins (cured products), and thermoplastic resins, and modified resins obtained by modifying these resins and the like.

Examples of the cured resin include resins obtained by curing a photocurable compound and a moisture-curable compound. The resin may be a cured product of a photocurable compound or a moisture-curable compound. The cured product of a photocurable compound or a moisture-curable compound can be a thermoplastic resin.

The photocurable compound or the moisture-curable compound is preferably a curable compound having a (meth)acryloyl group, and is more preferably a (meth)

acrylic polymer. The resin is preferably a curable compound having a (meth)acryloyl group, and is more preferably a (meth)acrylic polymer.

Examples of the thermoplastic resin include polyvinyl acetate, a polyester resin, a polyvinyl acetal resin, a vinyl acetate resin, polystyrene, an ethylene-vinyl acetate copolymer resin, an ethylene-acrylic acid copolymer resin, a polyurethane resin, an ionomer resin, a polyvinyl alcohol resin, a polyolefin resin such as aliphatic polyolefin, and a (meth)acrylic resin (polymer having a (meth)acryloyl group) and the like. The polyoxymethylene (or polyacetal) resin is included in the polyvinyl acetal resin. Thermoplastic resins other than these may be used as the resins. The thermoplastic resin may be a thermoplastic elastomer.

The thermoplastic resin means a resin that softens and exhibits plasticity when it is heated, and hardens, for example, when it is cooled to room temperature (25° C.). Among the thermoplastic resins, especially the thermoplastic elastomer means a resin that softens and exhibits plasticity when it is heated, and hardens to exhibits rubber elasticity, for example, when it is cooled to room temperature (25° C.)

The thermoplastic resins exemplified above can be a thermoplastic elastomer by adjusting the molecular structure, the polymerization degree and the like of the resin.

From the viewpoint of further enhancing the sound insulating property, the thermoplastic resin is preferably a polymer having a (meth)acryloyl group, and more preferably a (meth)acrylic polymer.

From the viewpoint of further enhancing the penetration resistance, it is preferred that the thermoplastic resin be a polyvinyl acetal resin, an ionomer resin or an ethylene-vinyl acetate copolymer resin, and it is more preferred that the thermoplastic resin be a polyvinyl acetal resin.

<(Meth)Acrylic Polymer>

It is preferred that the (meth)acrylic polymer be a polymer of a polymerizable composition containing a compound having a (meth)acryloyl group. The polymerizable composition contains a polymerizable component. In order to effectively prepare the (meth)acrylic polymer, the polymerizable composition may contain a photoreaction initiator. The polymerizable composition may contain an auxiliary for accelerating the reaction together with the photoreaction initiator. Representative examples of the compound having a (meth)acryloyl group include a (meth)acrylic ester and an N-substituted acrylamide having an amide group. It is preferred that the (meth)acrylic polymer be a poly(meth)acrylic ester.

It is preferred that the polymerizable component include a (meth)acrylic ester having a cyclic ether structure, a (meth)acrylic ester having an alicyclic structure, a (meth)acrylic ester having an aromatic ring, a (meth)acrylic ester having a polar group, an acyclic (meth)acrylic ester having 6 or less carbon atoms in the side chain, or an N-substituted acrylamide having an amide group. By using such a preferred (meth)acrylic ester or N-substituted acrylamide having an amide group, the effect of the present invention can be obtained effectively, and both of the sound insulating property and the ability to prevent foaming can be enhanced in good balance.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetane-3-yl)methyl (meth)acrylate, (3-propyloxetane-3-yl)methyl (meth)acrylate, (3-ethyloxetane-3-yl)methyl (meth)acrylate, (3-butyloxetane-3-yl)methyl (meth)acrylate, (3-ethyloxetane-3-yl)ethyl (meth)acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, (3-ethyloxetane-3-yl)hexyl (meth)acrylate; tetrahydrofurfuryl (meth)acrylate, (2,2-dimethyl-1,3-dioxolanedioxolane-4-yl)methyl (meth)acrylate, (2-methyl-2-ethyl-1,3-dioxolane-4-yl)methyl (meth)acrylate, (2-methyl-2-isobutyl-1,3-dioxolane-4-yl)methyl (meth)acrylate, (2-cyclohexyl-1,3-dioxolane-4-yl)methyl (meth)acrylate, tetrahydrofurfuryl alcohol acrylic acid multimer ester; tetrahydro-2H-pyran-2-yl-(meth)acrylate, 2-(1-[(tetrahydro-2H-pyran-2-yl)oxy]-2-methylpropyl) (meth)acrylate, cyclic trimethylol propane formal acrylate, (meth)acryloyl morpholine and the like. From the viewpoint of effectively obtaining the effect of the present invention, tetrahydrofurfuryl (meth)acrylate, or cyclic trimethylol propane formal acrylate is especially preferred.

Examples of the (meth)acrylic ester having an alicyclic structure include isobornyl (meth)acrylate, cyclohexyl (meth)acrylate, and the like.

Examples of the (meth)acrylic ester having an aromatic ring include benzyl acrylate, phenoxypolyethyleneglycol acrylate and the like.

Examples of the (meth)acrylic ester having a polar group include (meth)acrylic esters having a hydroxyl group, an amide group, an amino group, an isocyanate group, a carboxyl group or the like as the polar group.

Examples of the (meth)acrylic ester having a hydroxyl group include 2-hydroxyethyl (meth)acrylate, hydroxypropyl (meth)acrylate, 4-hydroxybutyl (meth)acrylate, 2-hydroxybutyl (meth)acrylate and the like.

Examples of the (meth)acrylic ester having an isocyanate group include triallylisocyanurate, and derivatives thereof and the like.

Examples of the (meth)acrylic ester having a carboxyl group include acrylic acid, ω-carboxy-polycaprolactone monoacrylate, 2-acryloyloxyethylsuccinic acid.

The above-described (meth)acrylic ester may be a polycarboxylic ester having a (meth)acryloyl group. Examples of the polycarboxylic ester having a (meth)acryloyl group include 2-acryloyloxyethyl succinate and the like.

Examples of the acyclic (meth)acrylic ester having 6 or less carbon atoms in the side chain include methyl (meth)acrylate, ethyl (meth)acrylate, propyl (meth)acrylate, butyl (meth)acrylate and the like.

For effectively obtaining the effect of the present invention, it is preferred that the content of the acyclic (meth)acrylic ester having 8 or more carbon atoms in the side chain in 100% by weight of the polymerizable component be less than 20% by weight.

Examples of the N-substituted acrylamide having an amide group include N,N-dimethylaminopropyl (meth)acrylamide, N,N-dimethyl (meth)acrylamide, (meth)acryloyl morpholine, N-isopropyl (meth)acrylamide, N-hydroxyethyl (meth)acrylamide and the like.

From the viewpoint of further enhancing the sound insulating property, in 100% by weight of the polymerizable component, the content of the N-substituted acrylamide having an amide group is preferably 30% by weight or less, more preferably 25% by weight or less, further preferably 20% by weight or less. In 100% by weight of the polymerizable component, when the content of the N-substituted acrylamide having an amide group is 10% by weight or more, it is possible to further reduce the peeled area in the impact resistance test at −20° C.

Examples of the (meth)acrylic ester include besides the compounds as recited above, diethyleneglycol monoethylether (meth)acrylate, 3-methoxybutyl (meth)acrylate, 2-acryloyloxyethyl-2-hydroxypropylphthalate, 2-acryloyloxyethyl-2-hydroxylpropylphthalate, cyclohexyl (meth) acrylate; ethylene glycol di(meth)acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth) acrylate; trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-acryloyloxyethyl)phosphate, tetramethylol methane tri(meth)acrylate, tetramethylol propane tetra(meth)acrylate, derivatives thereof and the like.

As to each of the (meth)acrylic ester and the N-substituted acrylamide having an amide group, one kind thereof may be used alone, and two or more kinds thereof may be used in combination. The (meth)acrylic polymer may be a homopolymer of the (meth)acrylic ester, or may be a copolymer of a polymerizable component containing the (meth)acrylic ester.

Concrete examples of the photoreaction initiator include 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl)titanium, 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, diethoxyacetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propane-1-one, 2-benzyl-2-dimethyl-amino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, (4-benzoylbenzyl) trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6-trimethylbenzoyl)-phenylphosphine oxide, triphenylmethylium tetrakis(pentafluorophenyl) borate and the like. Only one kind of the photoreaction initiator may be used, and two or more kinds thereof may be used in combination.

It is preferred that the photoreaction initiator be benzyldimethylketal, 1-hydroxycyclohexylphenylketone, or bis(2,4, 6-trimethylbenzoyl)phenylphosphine oxide.

In 100% by weight of the polymerizable composition, the content of the photoreaction initiator is preferably 0.01% by weight or more, more preferably 0.1% by weight or more and is preferably 10% by weight or less, more preferably by weight or less. When the content of the photoreaction initiator is the above lower limit or more and the above upper limit or less, the photoreactivity and the storage stability increase.

When the polymerizable composition contains a photocurable compound, it is preferred to use a photocuring device such as ultraviolet irradiation equipment so as to polymerize the photocurable compound. Examples of the ultraviolet irradiation device include a box-type device, and a belt-conveyer-type device, and the like. Examples of the ultraviolet lamp installed in the ultraviolet irradiation device include a superhigh-pressure mercury lamp, a high-pressure mercury lamp, a low-pressure mercury lamp, a chemical lamp, a metal halide lamp, an excimer lamp, and a UV-LED and the like. The ultraviolet lamp is preferably a chemical lamp or a UV-LED.

When the photocurable compound is irradiated with ultraviolet rays, the ultraviolet dose (cumulative dose) is preferably 500 mJ or more, more preferably 1000 mJ or more, further preferably 1500 mJ or more, and especially preferably 2000 mJ or more. The ultraviolet dose (cumulative dose) is preferably 20000 mJ or less, more preferably 10000 mJ or less, and further preferably 8000 mJ or less. When the ultraviolet dose (cumulative dose) is the above lower limit or more, it is possible to reduce the unreacted monomers. When the ultraviolet dose (cumulative dose) is the above upper limit or less, the storage stability increases. The irradiation intensity of the ultraviolet irradiation is preferably 0.1 mW or more, more preferably 0.5 mW or more, further preferably 1 mW or more, and especially preferably 2 mW or more.

<Polyvinyl Acetate>

It is preferred that the polyvinyl acetate be a polymer of a polymerizable composition containing vinyl acetate and a monomer having the functional group because excellent effect of the present invention is achieved.

Examples of the monomer having the functional group include 3-methyl-3-buten-1-ol, ethylene glycol monovinyl ether, isopropylacrylamide and the like.

From the viewpoint of effectively enhancing the sound insulating property, the weight average molecular weight of the polyvinyl acetate is preferably 250000 or more, more preferably 300000 or more, further preferably 400000 or more, especially preferably 500000 or more. From the viewpoint of enhancing the interlayer adhesive strength, the weight average molecular weight of the polyvinyl acetate is preferably 1200000 or less, more preferably 900000 or less.

The weight average molecular weight refers to a weight average molecular weight, calculated on the polystyrene equivalent basis, measured by gel permeation chromatography (GPC).

The method for polymerizing the polymerizable composition to synthesize the polyvinyl acetate is not particularly limited. Examples of the synthesizing method include solution polymerization, suspension polymerization, and UV polymerization and the like.

From the viewpoint of increasing the transparency of the interlayer film, and effectively enhancing the sound insulating property and the interlayer adhesive strength in the interlayer film having increased transparency, the synthesizing method of the polyvinyl acetate is preferably solution polymerization.

<Polyester Resin>

Examples of the polyester resin include polyethylene terephthalate and polyethylene naphthalate, and the like.

<Polyvinyl Acetal Resin>

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably by mole or more, more preferably 18% by mole or more, and preferably 40% by mole or less, and more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree of the polyvinyl acetal resin is preferably 0.01% by mole or more, more preferably 0.5% by mole or more, and preferably 10% by mole or less, and more preferably 2% by mole or less. When the acetylation degree is the above-described lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 55% by mole or more, more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further enhancing the effect of the present invention, it is preferred that the resin (1) be the (meth)acrylic polymer or the polyvinyl acetal resin, and it is more preferred that the resin (1) be the (meth)acrylic polymer.

From the viewpoint of further enhancing the effect of the present invention, and from the viewpoint of further enhancing the transparency and the sound insulating property of laminated glass, it is preferred that each of the resin (2) and the resin (3) contain the thermoplastic resin, and it is more preferred that each of each of the resin (2) and the resin (3) be the thermoplastic resin.

From the viewpoint of further enhancing the effect of the present invention, and from the viewpoint of further enhancing the transparency and the sound insulating property of laminated glass, it is preferred that the resin (2) be the polyvinyl acetal resin, and the resin (3) be the polyvinyl acetal resin.

From the viewpoint of further enhancing the production efficiency of the interlayer film, it is preferred that the resin (2) and the resin (3) be the same resin.

In 100% by weight of the first layer, the content of the resin (1) is preferably 10% by weight or more, more preferably 30% by weight or more, still more preferably 50% by weight or more, further preferably 60% by weight or more, especially preferably 65% by weight or more.

In 100% by weight of the resin contained in the second layer (in 100% by weight of the resin (2)), the content of the thermoplastic resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the resin (2) be the thermoplastic resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the second layer be a polyvinyl acetal resin.

In 100% by weight of the resin contained in the third layer (in 100% by weight of the resin (3)), the content of the thermoplastic resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the resin (3) be the thermoplastic resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the third layer be a polyvinyl acetal resin.

(Plasticizer)

It is preferred that the interlayer film contain a plasticizer. It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the impact resistance and the penetration resistance are further improved, and the adhesive force of a layer containing the polyvinyl acetal resin and the plasticizer to a lamination glass member or another layer is moderately increased. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, and organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, and tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, and decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, and azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, and a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, and triisopropyl phosphate, and the like.

It is preferred that the plasticizer be a diester plasticizer represented by the following formula (1).

[Chemical 1]

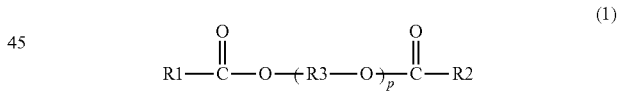

(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the first layer, the content of the plasticizer (1) per 100 parts by weight of the resin (1) is referred to as content (1). The content (1) is preferably 10 parts by weight or more, more preferably 20 parts by weight or more, further preferably 30 parts by weight or more, especially preferably 35 parts by weight or more, and is preferably 100 parts by weight or less, more preferably 80 parts by weight or less, further preferably 70 parts by weight or less, especially preferably 65 parts by weight or less. When the content (1) is the above lower limit or more, it is possible to prevent delamination of the interlayer film more effectively, and it is possible to further enhance the sound insulating property of laminated glass. When the content (1) is the above upper limit or less, the penetration resistance of laminated glass is further enhanced.

In the second layer, the content of the plasticizer (2) per 100 parts by weight of the resin (2) is referred to as content (2). The content (2) is preferably 20 parts by weight or more, more preferably 25 parts by weight or more, further preferably 30 parts by weight or more, and is preferably 45 parts by weight or less, more preferably 40 parts by weight or less, further preferably 37 parts by weight or less. When the content (2) is the above lower limit or more, it is possible to prevent delamination of the interlayer film more effectively, and it is possible to further enhance the sound insulating property of laminated glass. When the content (2) is the above upper limit or less, the penetration resistance of laminated glass is further enhanced. When the content (2) is the above upper limit or less, the flexural rigidity is further enhanced.

In the third layer, the content of the plasticizer (3) per 100 parts by weight of the resin (3) is referred to as content (3). The content (3) is preferably 20 parts by weight or more, more preferably 25 parts by weight or more, further preferably 30 parts by weight or more, and is preferably 45 parts by weight or less, more preferably 40 parts by weight or less, further preferably 37 parts by weight or less. When the content (3) is the above lower limit or more, it is possible to prevent delamination of the interlayer film more effectively, and it is possible to further enhance the sound insulating property of laminated glass. When the content (3) is the above upper limit or less, the penetration resistance of laminated glass is further enhanced. When the content (3) is the above upper limit or less, the flexural rigidity is further enhanced.

The content (1) and the content (2) may be the same or different from each other. The content (1) and the content (3) may be the same or different from each other. From the viewpoint of enhancing the sound insulating property of laminated glass, it is preferred that the content (1) and the content (2) be the same, or the content (1) be larger than the content (2), and it is more preferred that the content (1) be larger than the content (2). From the viewpoint of enhancing the sound insulating property of laminated glass, it is preferred that the content (1) and the content (3) be the same, or the content (1) be larger than the content (3), and it is more preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 5 parts by weight or more, more preferably 10 parts by weight or more, and further preferably 15 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

The interlayer film may contain a heat shielding substance. The first layer may contain a heat shielding substance. The second layer may contain a heat shielding substance. The third layer may contain a heat shielding substance. One kind of the heat shielding substance may be used alone, and two or more kinds thereof may be used in combination.

The heat shielding substance may contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

The Ingredient X may contain a vanadium atom or a copper atom. The Ingredient X may contain a vanadium atom, and may contain a copper atom. The Ingredient X may be at least one kind of phthalocyanines containing a vanadium atom or a copper atom, and derivatives of phthalocyanine containing a vanadium atom or a copper atom.

The interlayer film may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

As the heat shielding particles, metal oxide particles may be used. As the heat shielding particles, particles formed of an oxide of metal (metal oxide particles) may be used.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaB$_6$) particles, and the like. Heat shielding particles other than these may be used.

(Metal Salt)

The interlayer film may contain at least one kind of metal salt (hereinafter, sometimes described as Metal salt M) among an alkali metal salt and an alkaline earth metal salt. The alkali earth metal means six metals of Be, Mg, Ca, Sr, Ba, and Ra. The first layer may contain the metal salt M. The second layer may contain the metal salt M. The third layer may contain the Metal salt M. By the use of the Metal salt M, controlling the adhesivity between the interlayer film and a lamination glass member such as a glass plate or the adhesivity between respective layers in the interlayer film is facilitated. One kind of the metal salt M may be used alone, and two or more kinds thereof may be used in combination.

The metal salt M may contain at least one kind of metal selected from the group consisting of Li, Na, K, Rb, Cs, Mg, Ca, Sr and Ba.

As the metal salt M, an alkali metal salt of an organic acid having 2 to 16 carbon atoms, and an alkali earth metal salt of an organic acid having 2 to 16 carbon atoms can be used. The metal salt M may include a magnesium salt of a carboxylic acid having 2 to 16 carbon atoms, or a potassium salt of a carboxylic acid having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium ethylhexanoate, potassium 2-ethylhexanoate, and the like.

(Ultraviolet Ray Screening Agent)

The interlayer film may contain an ultraviolet ray screening agent. The first layer may contain an ultraviolet ray screening agent. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

When the polymerizable composition containing the compound having a (meth)acryloyl group contains a photocurable compound, the ultraviolet absorber may be introduced in an amount smaller than that of the photo initiator (the amount that does not inhibit the polymerization) at the time of polymerizing the photocurable compound, or the ultraviolet absorber may be introduced in a separate step after polymerizing the photocurable compound with the photo initiator.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

Examples of the ultraviolet ray screening agent containing a metal oxide include zinc oxide, titanium oxide, and cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, and a silicone compound, and the like.

Examples of the insulating metal oxide include silica, alumina, and zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

(Oxidation Inhibitor)

The interlayer film may contain an oxidation inhibitor. The first layer may contain an oxidation inhibitor. The second layer may contain an oxidation inhibitor. The third layer may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, and a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy)(2-ethylhexyloxy) phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

(Other Ingredients)

Each of the interlayer film, the first layer, the second layer, and the third layer may contain additives such as a coupling agent, a dispersing agent, a surfactant, a flame retardant, an antistatic agent, an adhesivity adjusting agent other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film is designated as T. The thickness of the first layer is preferably 0.005 T or more, more preferably 0.01 T or more, further preferably 0.02 T or more, and is preferably 0.17 T or less, more preferably 0.15 T or less, still more preferably 0.13 T or less, more preferably 0.1 T or less, further preferably 0.09 T or less. When the thickness is in the range from the aforementioned lower limit to the aforementioned upper limit, the sound insulating property is further enhanced in a wide range of temperature.

The thickness of each of the second layer and the third layer is 0.01 T or more, further preferably 0.1 T or more, and is preferably 0.6 T or less, more preferably 0.5 T or less, more preferably 0.45 T or less. When the thickness is in the range from the aforementioned lower limit to the aforementioned upper limit, the sound insulating property is further enhanced in a wide range of temperature.

The interlayer film may be an interlayer film having a uniform thickness, or may be an interlayer film having varying thickness. The sectional shape of the interlayer film may be a rectangular shape and may be a wedge-like shape.

The interlayer film may be wound to be formed into a roll body of the interlayer film. The roll body may include a winding core and an interlayer film wound on the outer periphery of the winding core.

The distance between one end and the other end of the interlayer film is preferably 3 m or less, more preferably 2 m or less, especially preferably 1.5 m or less, and is preferably 0.5 m or more, more preferably 0.8 m or more, especially preferably 1 m or more.

The production method of the interlayer film according to the present invention is not particularly limited. Examples of the production method of the interlayer film according to the present invention include a method of separately forming resin compositions used for constituting respective layers into respective layers, and then layering the obtained layers, a method of coextruding resin compositions used for constituting respective layers with an extruder and layering the layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-described interlayer film for laminated glass is arranged between the first lamination glass member and the second lamination glass member.

The laminated glass according to the present invention includes a first lamination glass member, a second lamination glass member, and an interlayer film for laminated glass having a one-layer structure or a two or more-layer structure. In the laminated glass according to the present invention, it is preferred that a loss factor at a second resonance frequency, a loss factor at a third resonance frequency, and a loss factor at a fourth resonance frequency measured by a central exciting method at 20° C. in mechanical impedance measurement in accordance with ISO16940 be respectively 0.4 or more.

Since the laminated glass according to the present invention has the above configuration, it is possible to enhance the sound insulating property of the laminated glass over a wide resonance frequency region.

In the laminated glass according to the present invention, a loss factor at a second resonance frequency measured by a central exciting method at 20° C. in mechanical impedance measurement in accordance with ISO16940 is 0.4 or more. Since the loss factor at the second resonance frequency is 0.4 or more, it is possible to enhance the sound insulating property of the laminated glass in a resonance frequency region of, for example, 500 Hz to 1200 Hz.

From the viewpoint of further enhancing the sound insulating property, the loss factor at the second resonance frequency is preferably 0.45 or more, more preferably 0.5 or more, further preferably 0.55 or more.

In the laminated glass according to the present invention, a loss factor at a third resonance frequency measured by a central exciting method at 20° C. in mechanical impedance measurement in accordance with ISO16940 is 0.4 or more. Since the loss factor at the third resonance frequency is 0.4 or more, it is possible to enhance the sound insulating property of the laminated glass in a resonance frequency region of, for example, 1200 Hz to 2500 Hz.

From the viewpoint of further enhancing the sound insulating property, the loss factor at the third resonance frequency is preferably 0.45 or more, more preferably 0.5 or more, further preferably 0.55 or more. The loss factor at the third resonance frequency may be more than 0.4, may be more than 0.45, may be more than 0.5, or may be more than 0.55.

In the laminated glass according to the present invention, a loss factor at a fourth resonance frequency measured by a central exciting method at 20° C. in mechanical impedance measurement in accordance with ISO16940 is 0.4 or more. Since the loss factor at the fourth resonance frequency is 0.4 or more, it is possible to enhance the sound insulating property of the laminated glass in a resonance frequency region of, for example, 2400 Hz to 4400 Hz.

From the viewpoint of further enhancing the sound insulating property, the loss factor at the fourth resonance frequency is preferably 0.45 or more, more preferably 0.5 or more, further preferably 0.55 or more. The loss factor at the fourth resonance frequency may be more than 0.4, may be more than 0.45, may be more than 0.5, or may be more than 0.55. The loss factor at the fourth resonance frequency may be 0.41 or more, may be 0.46 or more, may be 0.51 or more, or may be 0.56 or more.

In the laminated glass according to the present invention, a loss factor at a fifth resonance frequency measured by a central exciting method at 20° C. in mechanical impedance measurement in accordance with ISO16940 is preferably 0.4 or more, more preferably 0.45 or more, further preferably 0.5 or more, especially preferably 0.55 or more. The loss factor at the fifth resonance frequency may be more than 0.4, may be more than 0.45, may be more than 0.5, or may be more than 0.55. The loss factor at the fifth resonance frequency may be 0.41 or more, may be 0.46 or more, may be 0.51 or more, or may be 0.56 or more. When the loss factor at the fifth resonance frequency is the above lower limit or more, it is possible to further enhance the sound insulating property of the laminated glass in a resonance frequency region of, for example, 4000 Hz to 6500 Hz.

In the laminated glass according to the present invention, a loss factor at a sixth resonance frequency measured by a central exciting method at 20° C. in mechanical impedance measurement in accordance with ISO16940 is preferably 0.4 or more, more preferably 0.45 or more, further preferably 0.5 or more. When the loss factor at the sixth resonance frequency is the above lower limit or more, it is possible to further enhance the sound insulating property of the laminated glass in a resonance frequency region of, for example, 5500 Hz to 10000 Hz.

In the laminated glass according to the present invention, a loss factor at a seventh resonance frequency measured by a central exciting method at 20° C. in mechanical impedance measurement in accordance with ISO16940 is preferably 0.4 or more, more preferably 0.42 or more, further preferably 0.44 or more. When the loss factor at the seventh resonance frequency is the above lower limit or more, it is possible to further enhance the sound insulating property of the laminated glass in a resonance frequency region of, for example, 7000 Hz to 13000 Hz.

From the viewpoint of insulating road noise and motor noise of an electric vehicle, the loss factor at the third resonance frequency is preferably larger than the loss factor at the second resonance frequency, and is more preferably larger by 0.02 or more, and is further preferably larger by 0.04 or more.

From the viewpoint of insulating wind noise, engine noise of an engine-driven vehicle, and switching noise of an electric vehicle, the loss factor at the fourth resonance frequency is preferably larger than the loss factor at the second resonance frequency, and is more preferably larger by 0.06 or more, and is further preferably larger by 0.1 or more.

Among the loss factors measured by the central exciting method at 20° C. in mechanical impedance measurement in accordance with ISO16940, it is preferred that the maximum value of the loss factors be the loss factor at the third resonance frequency, the loss factor at the fourth resonance frequency, or the loss factor at the fifth resonance frequency. It is more preferred that the maximum value of the loss factors be the loss factor at the fourth resonance frequency or the loss factor at the fifth resonance frequency. In this case, it is possible to improve the sound insulating property for various noises generated during driving of an automobile more effectively.

In mechanical impedance measurement in accordance with ISO16940 of the laminated glass, a loss factor measured by the central exciting method at 20° C. is sometimes unmeasurable because the loss factor is too large. In the present invention, even when a loss factor measured by the central exciting method at 20° C. is unmeasurable because the loss factor is too large, the loss factor is regarded as being 0.4 or more.

When the laminated glass is subjected to the following impact resistance test at −20° C., a peeled area in the interface between the first layer and the second layer is preferably 50% or less, more preferably 40% or less, further preferably 30% or less. When the peeled area is the above upper limit or less, it is possible to enhance the adhesive strength between the first layer and the second layer, and as a result, it is possible to further enhance the sound insulating property of the laminated glass over a wide resonance frequency region. The impact resistance test at −20° C.

involves a temperature condition in which delamination is more likely to occur than in the impact resistance test at 20° C. or in the impact resistance test at 40° C.

Impact resistance test at −20° C.: the laminated glass is stored at −20±2° C. for 4 hours or more. For the laminated glass after storage, a steel ball with a mass of 227±2 g and a diameter of 38 mm is dropped from a height of 9.5 m to a position that is a middle position in the longitudinal direction and a middle position in the widthwise direction of the laminated glass at −20±2° C. in accordance with JIS R3211 or JIS R3212. A peeled area in the interface between the first layer and the second layer of the interlayer film is determined.

It is preferred that the laminated glass used in the impact resistance test at −20° C. be a laminated glass having a size of 300 mm in length and 300 mm in width.

The peeled area can be determined, for example, by the aforementioned formula.

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of the third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11a of the interlayer film 11A. The second lamination glass member 22 is layered on the second surface 11b opposite to the first surface 11a of the interlayer film 11A.

As described above, the laminated glass according to the present invention includes a first lamination glass member, a second lamination glass member, and an interlayer film, and the interlayer film is the interlayer film for laminated glass according to the present invention. In the laminated glass according to the present invention, the interlayer film is arranged between the first lamination glass member and the second lamination glass member.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one among the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and green glass, and the like. The organic glass is synthetic resin glass substituted for inorganic glass. Examples of the organic glass include a polycarbonate plate, and a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70° C. to 110° C. to obtain a laminate. Next, by putting the laminate into an autoclave or by pressing the laminate, the members are press-bonded together at about 120° C. to 150° C. and under a pressure of 1 MPa to 1.5 MPa. In this way, laminated glass can be obtained. At the time of producing the laminated glass, layers in the interlayer film may be laminated.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials were prepared.
(Resin)

Polyvinyl acetal resin (polyvinyl butyral resin (PVB1), average polymerization degree of 3000, content of hydroxyl group of 24% by mole, acetylation degree of 12% by mole, acetalization degree (butyralization degree) of 64% by mole))

Polyvinyl acetal resin (polyvinyl butyral resin (PVB2), average polymerization degree of 1700, content of hydroxyl group of 30.5% by mole, acetylation degree of 1% by mole, acetalization degree (butyralization degree) of 68.5% by mole))

(Meth)Acrylic Polymers (1) to (7), (X1):

A polymerizable composition having the blending composition shown in the following Table 1 was sandwiched between two PET sheets having subjected to a mold release treatment on one side (available from Nippa Corporation, having a thickness of 50 μm) to form a polymerizable composition layer having a thickness of 1 mm. A spacer was arranged around the two PET sheets. The polymerizable composition layer was irradiated with ultraviolet rays at 3 mW in a dose of 3000 mJ/cm$^2$ with a chemical lamp to cure the polymerizable composition by reaction, and thus (meth) acrylic polymers (1) to (7), (X1) were obtained.

Polyvinyl acetate (average polymerization degree 1700, "SN-17A" available from Denka Company Limited.)
(Plasticizer)
  Triethylene glycol di-2-ethylhexanoate (3GO)
  Dibutyl adipate (DBA)
(Metal Salt M)
  Mg mixture (50:50 (weight ratio) mixture of magnesium 2-ethylbutyrate and magnesium acetate)
(Ultraviolet Ray Screening Agent)
  Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
  BHT (2,6-di-t-butyl-p-cresol)

Example 1

Preparation of Composition for Forming First Layer:
The following components were mixed, and kneaded sufficiently with a mixing roll to obtain a composition for forming a first layer.
(Meth)Acrylic Polymer (1) 100 Parts by Weight
  Triethylene glycol di-2-ethylhexanoate (3GO) 55 parts by weight Preparation of composition for forming second layer and third layer:
The following components were mixed, and kneaded sufficiently with a mixing roll to obtain a composition for forming a second layer and a third layer.
  Polyvinyl acetal resin (PVB) 100 parts by weight Triethylene glycol di-2-ethylhexanoate (3GO) 30 parts by weight
  Metal salt M (Mg mixture) in such an amount that is 70 ppm in the obtained second layer and third layers
  Ultraviolet ray screening agent (Tinuvin 326) in an amount of 0.2% by weight in the obtained second layer and third layers Oxidation inhibitor (BHT) in an amount of 0.2% by weight in the obtained second layer and third layers Preparation of Interlayer Film:
By coextruding the composition for forming a first layer and a composition for forming a second layer and a third layer using a coextruder, an interlayer film (800 μm in thickness) having a layered structure with a stack of a second layer (350 μm in thickness)/a first layer (100 μm in thickness)/a third layer (350 μm in thickness) was prepared.

Preparation of Laminated Glass:
An interlayer film was sandwiched between two sheets of clear float glass in accordance with JIS R3202 having a width of 25 mm, a length of 300 mm and a thickness of 2 mm to obtain a laminate. The obtained laminate was put into a rubber bag and the inside thereof was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass (1). Also, a laminated glass (2) was obtained in the same manner as that in the laminated glass (1) except that clear float glass having a length of 300 mm, a width of 300 mm, and a thickness of 2 mm was used.

The obtained laminated glass (1) corresponds to the laminated glass X, and the obtained laminated glass (2) corresponds to the laminated glass Y.

Examples 2 to 7 and Comparative Examples 1 to 3

The interlayer film, the laminated glass (1) and the laminated glass (2) were obtained in the same manner as that in Example 1 except that the kind of the resin, and the kind and the content of the plasticizer were changed as shown in Table 2.

(Evaluation)
(1) Peel Strength

In the same manner as that for preparation of the interlayer film, each of the first layer (first layer for measurement of peel strength, 100 μm in thickness), the second layer (second layer for measurement of peel strength, 350 μm in thickness) and the third layer (third layer for measurement of peel strength, 350 μm in thickness) was prepared. The obtained first layer for measurement of peel strength, and the obtained second layer for measurement of peel strength were cut into a width of 10 mm and a length of 50 mm. Also, the obtained third layer for measurement of peel strength was cut into a width of 20 mm and a length of 50 mm. The cut first layer and the cut second layer were laminated at ordinary temperature to obtain a laminate. Lamination was conducted at 140° C. so that the first layer in the obtained laminate and the cut third layer were bonded together, to obtain a sample for evaluation of peel strength having a structure of "second layer/first layer" (10 mm in width)/ "third layer" (20 mm in width). By peeling the first layer and the third layer in the sample for evaluation of peel strength from each other in the direction of 180 degrees at a peel rate of 300 mm/min, peel strength was determined.

(2) Impact Resistance Test at −20° C.
The laminated glass (2) was stored at −20±2° C. for 4 hours or more. For the laminated glass (2) after storage, a steel ball with a mass of 227±2 g and a diameter of 38 mm was dropped from a height of 9.5 m to a position that is a middle position in the longitudinal direction and a middle position in the widthwise direction of the laminated glass (2) at −20±2° C. in accordance with JIS R3211 or JIS R3212. A peeled area in the interface between the first layer and the second layer of the interlayer film was determined using the aforementioned formula.

[Criteria for Determination in Impact Resistance Test at −20° C.]

∘∘: Peeled area is 0% or more and 10% or less
∘: Peeled area is more than 10% and 50% or less
x: Peeled area is more than 50

(3) Loss Factor (Sound Insulating Property)

In mechanical impedance measurement in accordance with ISO 16940 of the obtained laminated glass (1), a loss factor at a second resonance frequency, a loss factor at a third resonance frequency, a loss factor at a fourth resonance frequency, and a loss factor at a fifth resonance frequency measured by the central exciting method at 20° C. were determined. A loss factor measured by the central exciting method at 20° C. was calculated by the half width method from the frequency response function. Also, when calculation at less than 3 dB by the half width method is impossible, a loss factor was calculated by using a ndB width method.

The details and the results are shown in the following Tables 1 to 3. In Table, the description of the Metal salt M, the ultraviolet ray screening agent and the oxidation inhibitor was omitted.

TABLE 1

| | | | (Meth) acrylic polymer (1) | (Meth) acrylic polymer (2) | (Meth) acrylic polymer (3) | (Meth) acrylic polymer (4) | (Meth) acrylic polymer (5) | (Meth) acrylic polymer (6) | (Meth) acrylic polymer (7) | (Meth) acrylic polymer (X1) |
|---|---|---|---|---|---|---|---|---|---|---|
| Components | IBOA | parts by weight | 62 | 55 | 65 | 60 | 65 | 65 | 50 | |
| | CTFA (#200) | parts by weight | 30 | 30 | 30 | 25 | 10 | 10 | 20 | |
| | Acrylic acid | parts by weight | 8 | 5 | 5 | | | | | |
| | Benzyl acrylate | parts by weight | | 10 | | | | | | |
| | CHA | parts by weight | | | | | | | | 85 |
| | HPA | parts by weight | | | | | | | | 15 |
| | DMAA | parts by weight | | | | 15 | 15 | 15 | 20 | |
| | 2-EHA | parts by weight | | | | | | 10 | 10 | |
| | BA | parts by weight | | | | | 10 | | | |
| | IRGACURE 184 | parts by weight | 0.2 | 0.2 | 0.2 | 0.2 | 0.2 | 0.2 | 0.2 | 0.2 |

The details of the components in Table 1 are as follows.

IBOA: isobornyl acrylate (available from NIPPON SHOKUBAI CO., LTD.)

CTFA: cyclic trimethylolpropane formal acrylate (available from OSAKA ORGANIC CHEMICAL INDUSTRY LTD., VISCOAT #200)

Acrylic acid (available from NIPPON SHOKUBAI CO., LTD.)

Benzyl acrylate (available from OSAKA ORGANIC CHEMICAL INDUSTRY LTD.)

CHA: cyclohexyl acrylate (available from OSAKA ORGANIC CHEMICAL INDUSTRY LTD., VISCOAT #155)

HPA: hydroxypropyl acrylate (available from OSAKA ORGANIC CHEMICAL INDUSTRY LTD.)

DMAA: Dimethyl acrylamide (available from KJ Chemicals Corporation)

2-EHA: 2-ethylhexyl acrylate (available from NIPPON SHOKUBAI CO., LTD.)

BA: n-butyl acrylate (available from NIPPON SHOKUBAI CO., LTD.)

IRGACURE 184: 2,2-dimethoxy-1,2-diphenylethan-1-one (available from BASF)

TABLE 2

| | | | Unit | Example 1 | Example 2 | Example 3 | Example 4 | Example 5 |
|---|---|---|---|---|---|---|---|---|
| Interlayer film | First layer | Thickness | μm | 100 | 100 | 100 | 100 | 100 |
| | | Kind of resin | — | (Meth)acrylic polymer (1) | (Meth)acrylic polymer (2) | (Meth)acrylic polymer (3) | (Meth)acrylic polymer (4) | (Meth)acrylic polymer (5) |
| | | Content of resin | parts by weight | 100 | 100 | 100 | 100 | 100 |
| | | Kind of plasticizer | — | 3GO | 3GO | 3GO | 3GO | 3GO |
| | | Content of plasticizer | parts by weight | 55 | 50 | 50 | 50 | 50 |
| | Second and third layers | Each thickness | μm | 350 | 350 | 350 | 350 | 350 |
| | | Kind of resin | — | PVB2 | PVB2 | PVB2 | PVB2 | PVB2 |
| | | Content of resin | parts by weight | 100 | 100 | 100 | 100 | 100 |
| | | Kind of plasticizer | — | 3GO | 3GO | 3GO | 3GO | 3GO |
| | | Content of plasticizer | parts by weight | 30 | 30 | 30 | 30 | 30 |
| Peel strength (peel rate 300 mm/min) | | | N/10 mm | 11.5 | 9.0 | 6.2 | 7.1 | 7.2 |
| Impact resistance test at −20° C. (peeled area) | | | % | 10 | 30 | 40 | 10 | 10 |
| | | Determination | | ◯◯ | ◯◯ | ◯ | ◯◯ | ◯◯ |
| Sound insulating property | Loss factor at second resonance frequency | | — | 0.55 | 0.5 | 0.45 | 0.53 | 0.52 |
| | Loss factor at third resonance frequency | | — | 0.71 | 0.52 | 0.49 | 0.63 | 0.47 |
| | Loss factor at fourth resonance frequency | | — | 0.74 | 0.58 | 0.53 | 0.66 | 0.48 |
| | Loss factor at fifth resonance frequency | | — | 0.74 | 0.61 | 0.45 | 0.67 | 0.45 |

TABLE 3

| | | | Unit | Example 6 | Example 7 | Comparative Example 1 | Comparative Example 2 | Comparative Example 3 |
|---|---|---|---|---|---|---|---|---|
| Interlayer film | First layer | Thickness | μm | 100 | 100 | 100 | 100 | 100 |
| | | Kind of resin | — | (Meth)acrylic polymer (6) | (Meth)acrylic polymer (7) | PVB1 | Polyvinyl acetate | (Meth)acrylic polymer (X1) |
| | | Content of resin | parts by weight | 100 | 100 | 100 | 100 | 100 |
| | | Kind of plasticizer | — | 3GO | 3GO | 3GO | DBA | 3GO |
| | | Content of plasticizer | parts by weight | 50 | 40 | 70 | 50 | 35 |
| | Second and third layers | Each thickness | μm | 350 | 350 | 350 | 350 | 350 |
| | | Kind of resin | — | PVB2 | PVB2 | PVB2 | PVB2 | PVB2 |
| | | Content of resin | parts by weight | 100 | 100 | 100 | 100 | 100 |
| | | Kind of plasticizer | — | 3GO | 3GO | 3GO | DBA | 3GO |
| | | Content of plasticizer | parts by weight | 30 | 30 | 38 | 35 | 32 |
| Peel strength (peel rate 300 mm/min) | | | N/10 mm | 7.5 | 5.7 | 5.5 | 0.8 | 2.3 |
| Impact resistance test at −20° C. (peeled area) | | | % | 10 | 10 | 0 | 100 | 90 |
| | | Determination | | ◯◯ | ◯◯ | ◯◯ | X | X |
| Sound insulating property | Loss factor at second resonance frequency | | — | 0.53 | 0.55 | 0.37 | 0.35 | 0.4 |
| | Loss factor at third resonance frequency | | — | 0.48 | 0.6 | 0.42 | 0.44 | 0.48 |
| | Loss factor at fourth resonance frequency | | — | 0.5 | 0.6 | 0.37 | 0.53 | 0.38 |
| | Loss factor at fifth resonance frequency | | — | 0.45 | 0.45 | 0.33 | 0.38 | 0.28 |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (First layer)
11a: First surface
11b: Second surface
21: First lamination glass member
22: Second lamination glass member
31, 31A: Laminated glass

The invention claimed is:

1. An interlayer film for laminated glass having a one-layer or two or more-layer structure,
the interlayer film, when arranged between two sheets of a clear float glass having a width of 25 mm, a length of 300 mm and a thickness of 2 mm to obtain a laminated glass X, has a loss factor at a second resonance frequency, a loss factor at a third resonance frequency, and a loss factor at a fourth resonance frequency measured by a central exciting method at 20° C. in mechanical impedance measurement in accordance with ISO16940 of the laminated glass X of respectively 0.4 or more, and the interlayer film comprises a first layer, the first layer comprises a resin and a plasticizer, wherein the resin is a (meth)acrylic polymer, and a content of the plasticizer in the first layer is 30 parts by weight or more and 65 parts by weight or less per 100 parts by weight of the resin in the first layer.

2. The interlayer film for laminated glass according to claim 1, wherein a loss factor at a fifth resonance frequency measured by a central exciting method at 20° C. in mechanical impedance measurement in accordance with ISO16940 of the laminated glass X is 0.4 or more.

3. The interlayer film for laminated glass according to claim 1, wherein the loss factor at the second resonance frequency is 0.5 or more, the loss factor at the third resonance frequency is 0.5 or more, and the loss factor at the fourth resonance frequency is 0.5 or more.

4. The interlayer film for laminated glass according to claim 1, wherein the loss factor at the third resonance frequency is larger than the loss factor at the second resonance frequency.

5. The interlayer film for laminated glass according to claim 1, wherein the loss factor at the fourth resonance frequency is larger than the loss factor at the second resonance frequency.

6. The interlayer film for laminated glass according to claim 1, which has the two or more-layer structure, and the interlayer film further comprises a second layer layered on a first surface of the first layer.

7. The interlayer film for laminated glass according to claim 6, which has a three or more-layer structure, and the interlayer film further comprises a third layer layered on a second surface opposite to the first surface of the first layer.

8. The interlayer film for laminated glass according to claim 6, wherein when the interlayer film is arranged between two sheets of a clear float glass having a thickness of 2 mm to obtain a laminated glass Y having a size of 300 mm in length and 300 mm in width, and the obtained laminated glass Y is subjected to an impact resistance test at −20° C., a peeled area in an interface between the first layer and the second layer is 50% or less, and the impact resistance test at −20° C. comprises:

storing the laminated glass Y at −20±2° C. for 4 hours or more; after storing the laminated glass Y, dropping a steel ball with a mass of 227±2 g and a diameter of 38 mm from a height of 9.5 m to a position that is a middle position in a longitudinal direction and a middle position in a widthwise direction of the laminated glass Y at −20±2° C. in accordance with JIS R3211 or JIS R3212; and then determining a peeled area in the interface between the first layer and the second layer of the interlayer film.

9. A laminated glass comprising:
a first lamination glass member;
a second lamination glass member; and
the interlayer film for laminated glass according to claim 1, wherein the interlayer film for laminated glass is arranged between the first lamination glass member and the second lamination glass member.

10. A laminated glass comprising:
a first lamination glass member,
a second lamination glass member, and
an interlayer film for laminated glass having a one-layer or two or more-layer structure, wherein the laminated glass has a loss factor at a second resonance frequency, a loss factor at a third resonance frequency, and a loss factor at a fourth resonance frequency measured by a central exciting method at 20° C. in mechanical impedance measurement in accordance with ISO16940 of respectively 0.4 or more, the interlayer film comprises a first layer, the first layer comprises a resin and a plasticizer, wherein the resin is a (meth)acrylic polymer, and a content of the plasticizer in the first layer is 30 parts by weight or more and 65 parts by weight or less per 100 parts by weight of the resin in the first layer.

11. The laminated glass according to claim 10, wherein in mechanical a mechanical impedance measurement in accordance with ISO16940, a loss factor at a fifth resonance frequency measured by a central exciting method at 20° C. is 0.4 or more.

12. The laminated glass according to claim 10, wherein the loss factor at the second resonance frequency is 0.5 or more, the loss factor at the third resonance frequency is 0.5 or more, and the loss factor at the fourth resonance frequency is 0.5 or more.

13. The laminated glass according to claim 10, wherein the loss factor at the third resonance frequency is larger than the loss factor at the second resonance frequency.

14. The laminated glass according to claim 10, wherein the loss factor at the fourth resonance frequency is larger than the loss factor at the second resonance frequency.

15. The laminated glass according to claim 10, wherein the interlayer film has the two or more-layer structure, and the interlayer film further comprises a second layer layered on a first surface of the first layer.

16. The laminated glass according to claim 15, wherein the interlayer film has a three or more-layer structure, and the interlayer film further comprises a third layer layered on a second surface opposite to the first surface of the first layer.

17. The laminated glass according to claim 15, wherein when an impact resistance test at −20° C. is conducted, a peeled area in an interface between the first layer and the second layer is 50% or less, and the impact resistance test at −20° C. comprises:

storing the laminated glass at −20±2° C. for 4 hours or more; after storing the laminated glass, dropping a steel ball with a mass of 227±2 g and a diameter of 38 mm from a height of 9.5 m to a position that is a middle position in a longitudinal direction and a middle position in a widthwise direction of the laminated glass at −20±2° C. in accordance with JIS R3211 or JIS R3212; and then determining a peeled area in the interface between the first layer and the second layer of the interlayer film.

* * * * *